United States Patent
Sisto et al.

(10) Patent No.: US 7,719,977 B2
(45) Date of Patent: *May 18, 2010

(54) METHOD AND APPARATUS FOR DYNAMICALLY ALLOCATING UPSTREAM BANDWIDTH IN PASSIVE OPTICAL NETWORKS

(75) Inventors: John Ferdinand Sisto, Rohnert Park, CA (US); Edward Wayne Boyd, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/105,536

(22) Filed: Apr. 18, 2008

(65) Prior Publication Data

US 2008/0212965 A1    Sep. 4, 2008

Related U.S. Application Data

(63) Continuation of application No. 10/663,608, filed on Sep. 15, 2003, now Pat. No. 7,362,704.

(51) Int. Cl.
*G01R 31/08*    (2006.01)
(52) U.S. Cl. ............... 370/230; 370/395.2; 370/395.51
(58) Field of Classification Search ........................ None
See application file for complete search history.

(56) References Cited

U.S. PATENT DOCUMENTS

| | | | | |
|---|---|---|---|---|
| 5,440,716 A | * | 8/1995 | Schultz et al. | 711/114 |
| 6,122,272 A | * | 9/2000 | Tomaszewski et al. | 370/351 |
| 6,134,217 A | * | 10/2000 | Stiliadis et al. | 370/232 |
| 6,185,221 B1 | | 2/2001 | Aybay | |
| 6,426,944 B1 | * | 7/2002 | Moore | 370/236 |
| 6,463,484 B1 | * | 10/2002 | Moss | 710/36 |
| 6,546,014 B1 | | 4/2003 | Kramer et al. | |
| 6,643,290 B1 | * | 11/2003 | Glade | 370/395.4 |
| 7,006,530 B2 | * | 2/2006 | Spinar et al. | 370/468 |
| 7,362,704 B2 | * | 4/2008 | Sisto et al. | 370/230 |

\* cited by examiner

*Primary Examiner*—Robert W Wilson
(74) *Attorney, Agent, or Firm*—Park, Vaughan & Fleming LLP; Shun Yao

(57) ABSTRACT

One embodiment of the present invention provides a system that facilitates dynamic allocation of upstream bandwidth in a passive optical network which includes a central node and at least one remote node. Each remote node is coupled to at least one logical entity, which corresponds to a device or a user, that transmits upstream data to the central node and receives downstream data from the central node. The central node is coupled to an external network outside of the passive optical network through a shared out-going uplink.

25 Claims, 6 Drawing Sheets

METHOD AND APPARATUS FOR DYNAMICALLY ALLOCATING UPSTREAM BANDWIDTH IN PASSIVE OPTICAL NETWORKS

RELATED APPLICATIONS

This application is a continuation of and claims the benefit under 35 U.S.C. section 120 of a U.S. patent application Ser. No. 10/663,608, filed 15 Sep. 2003, which has been allowed and is scheduled to issue on 22 Apr. 2008 as U.S. Pat. No. 7,362,704.

BACKGROUND OF THE INVENTION

1. Field of the Invention

The present invention relates to the design of passive optical networks. More specifically, the present invention relates to a method and apparatus for dynamically allocating upstream bandwidth in a passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among different technologies, Ethernet passive optical networks (EPONs) appear to be the best candidate for next-generation access networks. EPONs combine the ubiquitous Ethernet technology with inexpensive passive optics. Therefore, they offer the simplicity and scalability of Ethernet, and the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Transmissions within an EPON are typically performed between an optical line terminal (OLT) and optical networks units (ONUs) (see FIG. 2). The OLT generally resides in the central office and couples the optical access network to the metro backbone, which is typically an external network belonging to an ISP or a local exchange carrier. The ONU can be located either at the curb or at an end-user location, and can provide broadband voice, data, and video services.

Communications within an EPON can be divided into upstream traffic (from ONUs to OLT) and downstream traffic (from OLT to ONUs). Because of the broadcast nature of Ethernet, the downstream traffic can be delivered with considerable simplicity in an EPON: packets are broadcast by the OLT and extracted by their destination ONU based on their media access control (MAC) addresses. However, in the upstream direction, the ONUs need to share the channel capacity and resources. Moreover, the burstiness of network traffic and the requirement of different service level agreements (SLAs) make the upstream bandwidth allocation a challenging problem.

Hence, what is needed is a method and apparatus for dynamically allocating upstream bandwidth in an EPON, which is fair, efficient, and responsive, and which accommodates bursty traffic while satisfying SLAs.

SUMMARY

One embodiment of the present invention provides a system that facilitates dynamic allocation of upstream bandwidth in a passive optical network which includes a central node and at least one remote node. Each remote node is coupled to at least one logical entity, which corresponds to a device or a user, that transmits upstream data to the central node and receives downstream data from the central node. The central node is coupled to an external network outside of the passive optical network through a shared out-going uplink.

During operation, the system receives a request from a remote node for a grant to transmit upstream data from a logical entity associated with the remote node to the central node, wherein the size of the data to be transmitted does not exceed a transmission threshold assigned to that logical entity, and a logical entity may not request more than what is allowed by the corresponding transmission threshold. If the request satisfies a bandwidth allocation policy, the system issues a grant to the remote node to transmit upstream data. In response to the grant, the system receives upstream data from the remote node and places the received upstream data in a receiver buffer within the central node. This receiver buffer includes a number of FIFO queues, each of which buffers upstream data received from an associated logical entity. Next, the system retrieves and transmits data stored in the receiver buffer to the out-going uplink according to a set of SLAs.

In a variation of this embodiment, satisfying the bandwidth allocation policy requires that there be sufficient available space in the receiver buffer to accommodate the upstream data to be transmitted, and that the logical entity from which upstream data transmission is requested is scheduled to transmit data next.

In a further variation, all the logical entities within the passive optical network are scheduled to transmit upstream data in a hierarchical round-robin scheme by performing the following operations:

(1) grouping logical entities with the highest priority to form a top-priority level;

(2) allowing each logical entity in the top-priority level to transmit upstream data in a round-robin fashion by assigning a slot to each logical entity in the top-priority level;

(3) within the top-priority level, reserving one slot for lower-priority traffic;

(4) grouping logical entities with the second-highest priority to form a second-priority level;

(5) allowing each logical entity in the second-priority level to transmit data by assigning the reserved slot within the top-priority level to each logical entity in the second-priority level in a round-robin fashion;

(6) within the second-priority level, reserving one slot for lower-priority traffic; and (7) repeating operations similar to operations (4)-(6) for logical entities with lower priorities until every logical entity is assigned a slot for transmitting upstream data according to its priority.

In a variation of this embodiment, the transmission threshold assigned to a logical entity within a priority level is determined by considering the maximum allowable delay for that priority level, data speed of the shared out-going uplink, the logical entity's SLA, and the total number of logical entities within that priority level.

In a variation of this embodiment, the system keeps a record of outstanding data for each logical entity, wherein outstanding data is upstream data for which a grant for transmission has been issued by the central node, but which has not been received by the central node. To calculate available space in the receiver buffer, the system subtracts the size of outstanding data from the unfilled space of the corresponding FIFO queue. After a period of time following issuance of a grant for transmitting a piece of data, the data is due to arrive at the system. The system accordingly removes the information pertinent to the piece of data from the record of outstanding data for the corresponding logical entity, which is done regardless of whether the piece of data has actually been received by the central node.

In a variation of this embodiment, the system retrieves and transmits data stored in each FIFO queue within the receiver buffer in a hierarchical round-robin scheme in accordance with each logical entity's SLA.

In a variation of this embodiment, each remote node includes a number of queues, each of which is associated with a logical entity and stores upstream data from the device or user associated with that logical entity.

In a further variation, the request from the remote node reports the state of a queue within that remote node associated with a logical entity, and the request piggybacks on an upstream data transmission.

In a further variation, if a FIFO queue within the receiver buffer in the central node is full, the system pauses the issuing of grants to the corresponding logical entity, thereby causing the queue associated with that logical entity within a remote node to become full. This causes the remote node to generate a flow-control message to the corresponding device or user to slow down or pause the upstream data transmission from that device or user.

In a variation of this embodiment, a remote node tracks the amount of time between the grants to transmit upstream data for each logical entity associated with the remote node. If the amount of time between grants exceeds a certain interval, the remote node sets an alarm and sends a message to the central node via an Operation, Administration and Maintenance (OAM) frame, whereby upon receiving the message, the central node is allowed to reset a record associated with the corresponding logical entity.

In a variation of this embodiment, the central node periodically sends out polls to the remote nodes to see if a logical entity has any data to send. The polling frequency for a corresponding logical entity reflects the SLA of the logical entity. If a non-poll grant has been previously sent to a logical entity, the subsequent poll to that logical entity is sent at a time after the non-poll grant, the time being calculated in accordance to the corresponding polling frequency.

In a further variation, a remote node tracks the amount of elapsed time between non-poll grants for each logical entity associated with the remote node. If the elapsed time between non-poll grants for a logical entity exceeds a certain interval, the remote node sets an alarm. If the alarm is set and the remote node has data to send from the corresponding logical entity, the remote node sends a message to the central node via an OAM frame denoting an error condition, which instructs the central node that the logical entity is in an error state. Upon receiving the message, the central node is allowed to reset or modify a record associated with the logical entity.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Passive Optical Network Topology

Figure 1:
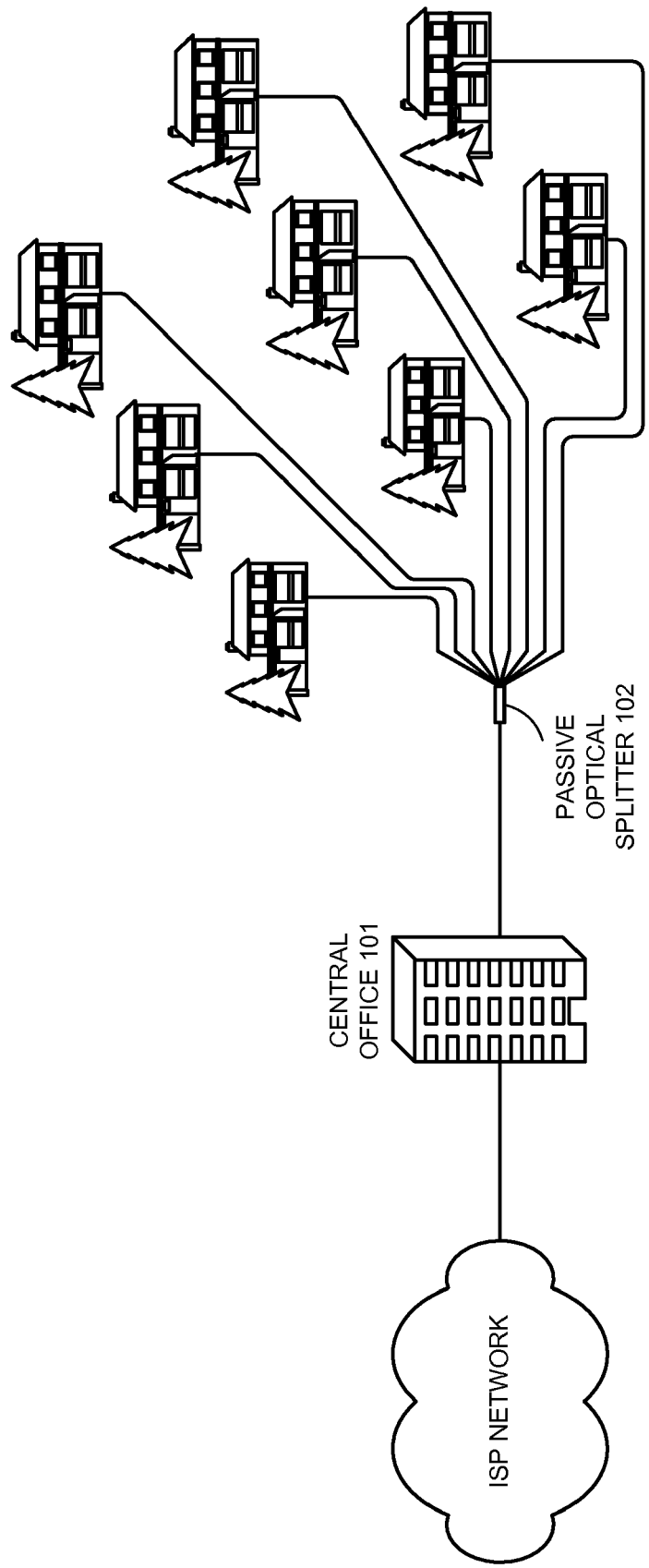
FIG. 1 illustrates a passive optical network wherein a central office and a number of subscribers form a tree topology through optical fibers and a passive optical splitter (prior art).

FIG. 1 illustrates a passive optical network, wherein a central office and a number of subscribers form a tree topology through optical fibers and a passive optical splitter. As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. The central office is coupled to an external network, such as a metropolitan area network operated by an ISP.

Figure 2:
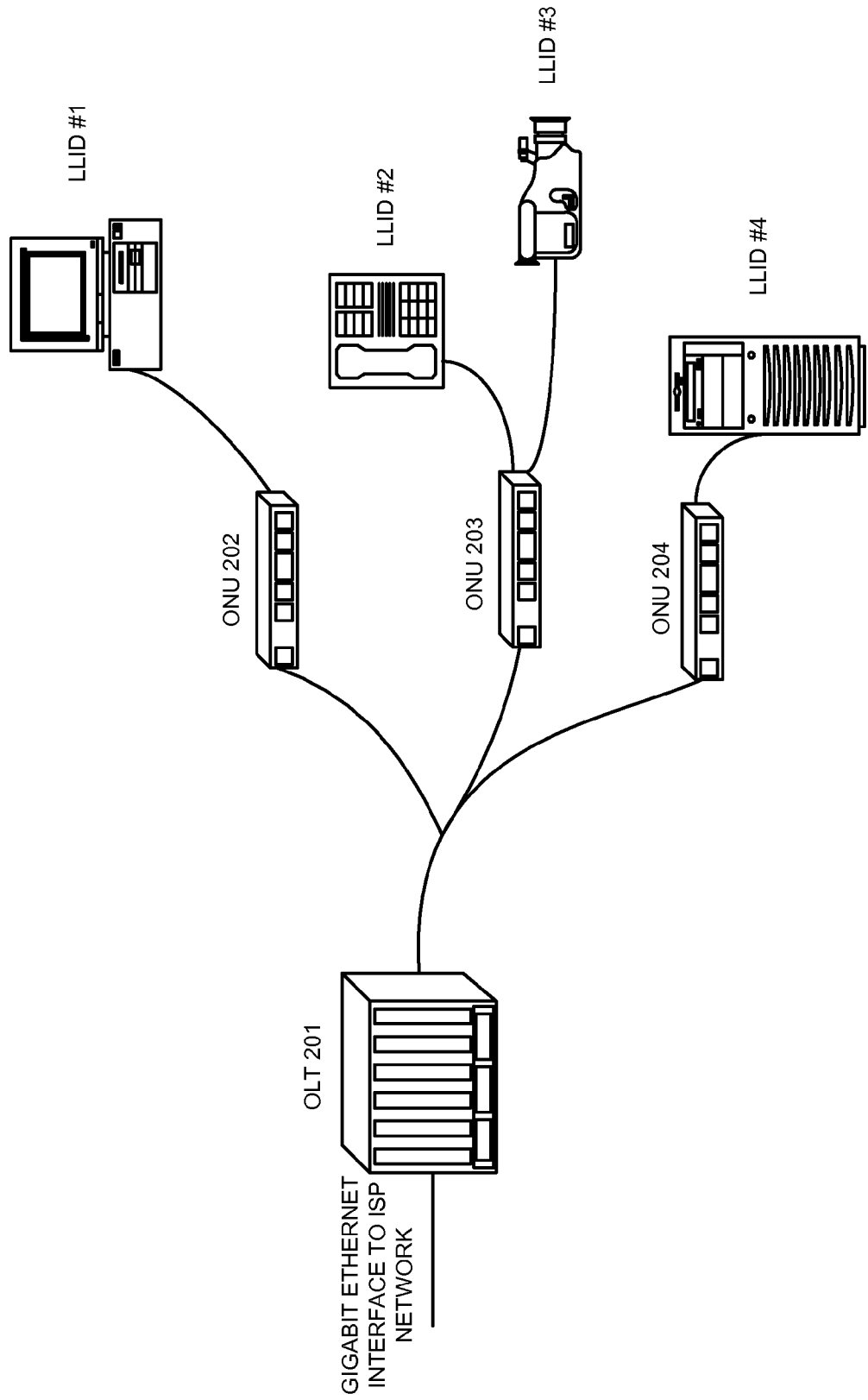
FIG. 2 illustrates a passive optical network including an OLT and ONUs (prior art).

FIG. 2 illustrates a passive optical network including an OLT and ONUs. OLT 201 is coupled with ONUs 202, 203, and 204 through optical fibers and a passive optical splitter. An ONU can accommodate a number of networked devices, such as personal computers, telephones, video equipment, network servers, etc. Note that a networked device can identify itself by using a Logical Link ID (LLID), as defined in the IEEE 802.3 standard.

Dynamic Bandwidth Allocation Mechanism

Figure 3:
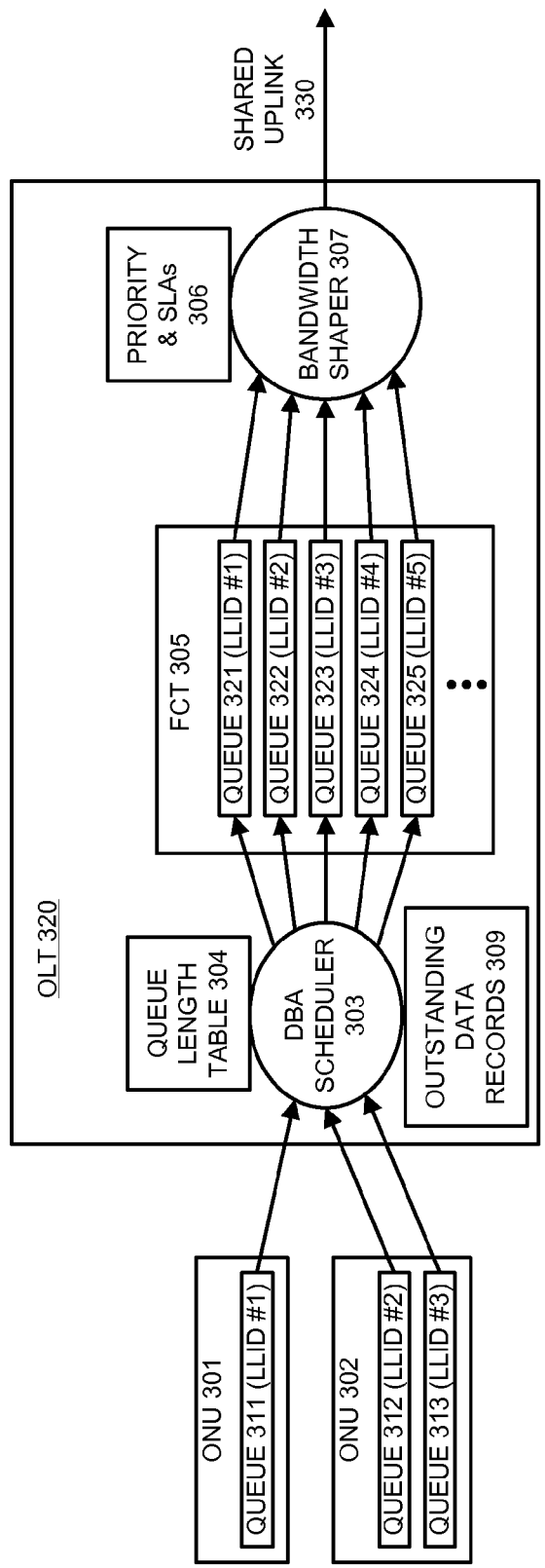
FIG. 3 illustrates the architecture of an OLT that facilitates dynamic upstream bandwidth allocation in accordance with an embodiment of the present invention.

FIG. 3 illustrates the architecture of an OLT that facilitates dynamic upstream bandwidth allocation in accordance with an embodiment of the present invention. In this example, an OLT 320 accepts requests and upstream data traffic from ONUs 301 and 302. Each ONU maintains a number of queues, for example queues 311, 312, and 313, each of which stores upstream data from an LLID corresponding to a device or a user that couples to that ONU. Note that upstream data from an LLID is carried in data frames (e.g., Ethernet frames), which have variable sizes. During transmission these data frames are removed from their respective queue. An LLID requests a grant, to transmit upstream data, via a report message. The report message indicates the amount of data in the LLID's corresponding queue(s). Typically, these request messages can piggyback on an upstream data transmission.

Within OLT 310, a dynamic bandwidth allocation (DBA) scheduler 303 receives the report messages from ONUs. OLT 310 also includes a FIFO queue controller (FCT) 305, which contains a number of FIFO queues (321, 322, 323, 324, and 325) that are associated with different LLIDs. Upstream data from each LLID is temporarily stored in these FIFO queues before being transmitted to the external ISP network through a shared uplink 330. The state of these FIFO queues is monitored and stored in a queue length table 304.

After receiving a request from an LLID, DBA scheduler 303 determines whether a grant to transmit can be sent to the requesting LLID based on two considerations. First, whether there is sufficient available space in the FIFO queue corresponding to the requesting LLID, according queue length table 304. Second, whether the requesting LLID is the next in turn to transmit data as scheduled. (Note that proper scheduling of LLIDs for upstream data transmission is necessary to guarantee fair and efficient bandwidth allocation among all the LLIDs.) When both conditions are met, the DBA scheduler issues a grant to the requesting LLID. The grant allocates an upstream transmission time slot to the LLID.

Note that outstanding data for each LLID can be taken into account in the calculation of available space in the FIFO queues. Outstanding data is the "in-flight" data for which a grant for transmission has been given, but which has not been received by OLT 320. Records of outstanding data are stored in data structure 309. When calculating available space in a FIFO queue, DBA scheduler 303 subtracts the amount of outstanding data of the requesting LLID from the available physical space in the corresponding FIFO queue, and uses the result as the actual available space for future data transmission.

With regard to scheduling upstream transmission, one possible scheme is the hierarchical round-robin scheme, which can be used to fairly and efficiently allocate bandwidth among all LLIDs. Another possible scheduling scheme is strict priority scheduling. However, because SLAs usually place constraints on parameters such as average bit rate, maximum delay, etc., a transmission threshold (the maximum amount of data in each transmission) may be set for every LLID in the hierarchical round-robin scheme. A more detailed discussion of this scheme appears in the discussion related to FIG. 5 below.

OLT 320 further includes a bandwidth shaper 307, which retrieves data stored in the FIFO queues within FCT 305 and transmits the retrieved data to shared uplink 330. Bandwidth shaper 307 ensures that the data stored in FCT 305 is served in accordance with the priority classification and SLA pertinent to each LLID, which is stored in data structure 306. Like the scheduling mechanism within DBA scheduler 303, the scheduling mechanism within bandwidth shaper 307 is desired to be fair and efficient, and therefore can also use the hierarchical round-robin scheduling scheme.

Figure 4:
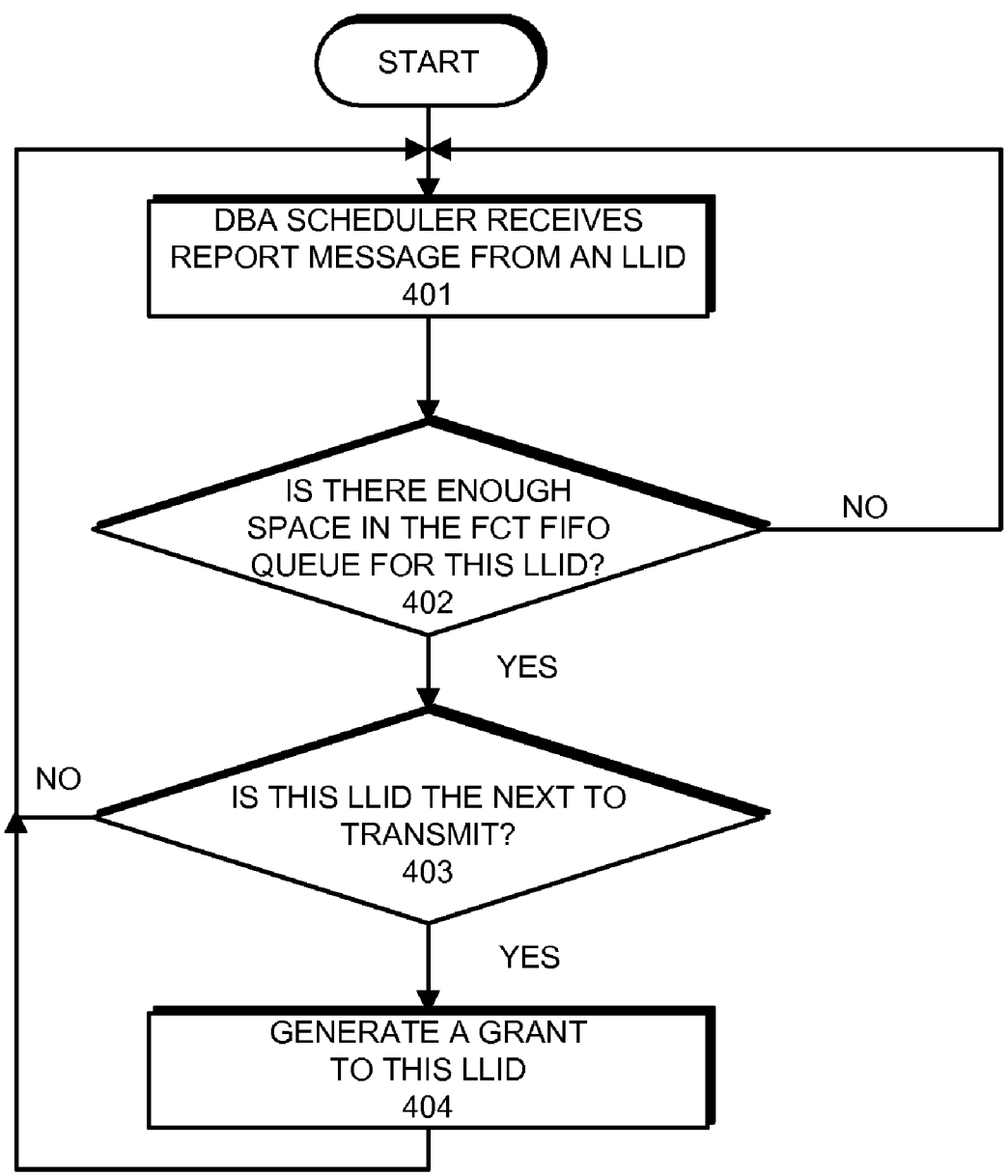
FIG. 4 presents a flow chart illustrating the dynamic upstream bandwidth allocation process in accordance with an embodiment of the present invention.

FIG. 4 presents a flow chart illustrating the dynamic upstream bandwidth allocation process in accordance with an embodiment of the present invention. The system starts by receiving a report message from an LLID at the DBA scheduler 303 (step 401). DBA scheduler 303 then determines if there is sufficient space in the FIFO queue within FCT 305 for this LLID (taking into account the outstanding data) (step 402). If there is not sufficient space, DBA scheduler temporarily holds the grant for the requesting LLID until sufficient space becomes available in the FIFO queue. Meanwhile, the system can receive and process requests from other LLIDs by returning to step 401.

If there is sufficient space in the FIFO queue within FCT 305, DBA scheduler 303 further determines if the requesting LLID is scheduled to transmit data next (step 403). If not, DBA scheduler 303 will temporarily hold the grant until the requesting LLID is the next to transmit. Meanwhile, the system can receive and process requests from other LLIDs by returning to step 401.

If it is the requesting LLID's turn to transmit, DBA scheduler generates a grant and sends it to the requesting LLID (step 404). The system then returns to step 401 and continues to receive and process subsequent requests.

Flow-Control Mechanism

Figure 5:
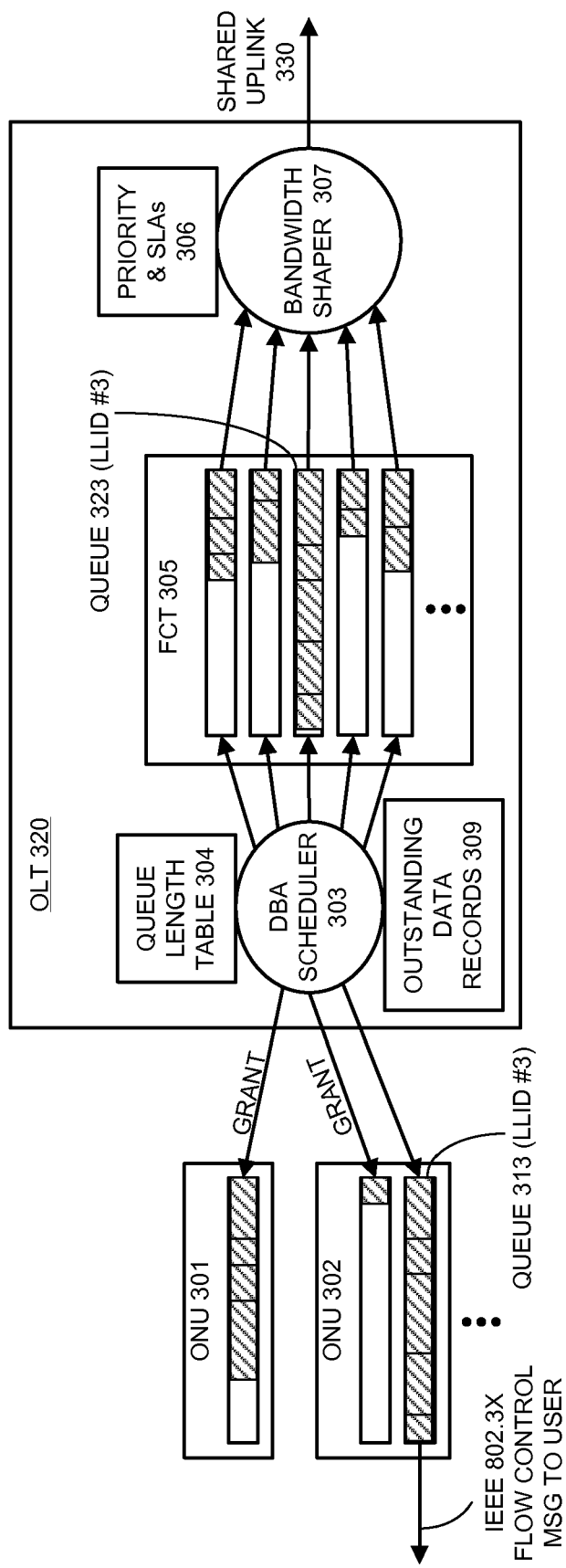
FIG. 5 illustrates a flow-control mechanism within an OLT that facilitates dynamic upstream bandwidth allocation in accordance with an embodiment of the present invention.

FIG. 5 illustrates a flow-control mechanism within an OLT that facilitates dynamic upstream bandwidth allocation in accordance with an embodiment of the present invention. In this example, when FIFO queue 323 is filled, DBA scheduler 303 stops granting transmission from LLID #3, thereby causing queue 313 to fill. ONU 302 can then generate a flow-control message in accordance with the IEEE 802.3x standard to the corresponding device or user to slow down, or pause, further upstream data transmission.

Hierarchical Round-Robin Scheduling with Transmission Thresholds

Figure 6:
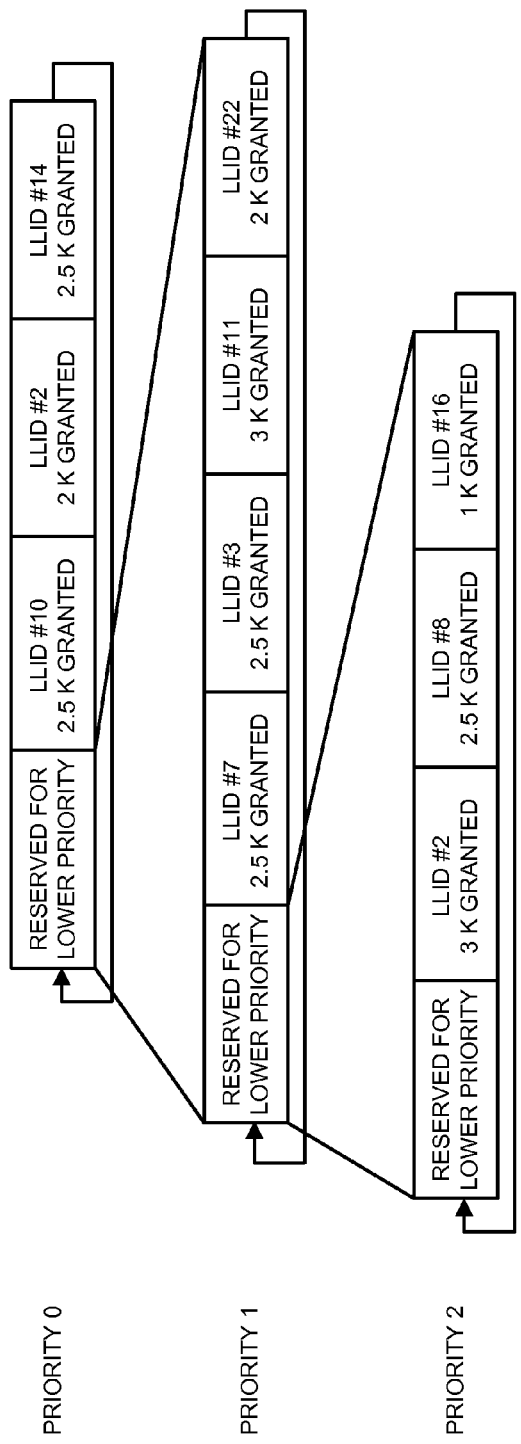
FIG. 6 illustrates a hierarchical round-robin scheduling scheme with transmission thresholds in accordance with an embodiment of the present invention.

FIG. 6 illustrates a hierarchical round-robin scheduling scheme with transmission thresholds in accordance with an embodiment of the present invention. This hierarchical round-robin scheduling is performed as follows:

First, group all LLIDs with the highest priority (priority 0). Within priority 0, assign each LLID a transmission slot in accordance to an amount of data burst the LLID is allowed to transmit upstream. The LLID is provisioned to not report a value greater than this amount. Although the aggregate of all report messages in a report frame may exceed this threshold, the amount of data implied in each individual message cannot exceed this burst size. The slot size provisioned for each LLID is determined such that all the LLIDs may be serviced within a fixed delay bounds. For example, if the delay bounds for priority 0 is one ms, and shared uplink 330's data speed is 1 Gb/s, then the total duration of priority 0 may not exceed 1000 Kb. Therefore, the aggregate slot size of priority 0 LLIDs would sum up to less than or equal to 1000 Kb.

Within priority 0, one slot is allocated for lower priority traffic. This slot is denoted as the drop-down slot. All lower-priority traffic is allowed to transmit within this reserved slot.

Next, group all of the LLIDs with the second highest priority (priority 1). Within priority 1, assign each LLID a transmission slot according to the maximum burst the LLID may transmit upstream. The LLID will be configured such that it will observe this maximum burst size when reporting. A slot in priority 1 is allowed to transmit inside the slot reserved for lower-priority traffic (the drop-down slot) within priority 0. Since a priority 1 LLID may only transmit when priority 0 is transmitting its drop-down slot, the delay of the queuing delay of priority 1 LLIDs is typically many times of the queuing delay of priority 0 LLIDs.

Within priority 1, there is similarly one slot reserved for lower-priority traffic.

As shown in FIG. 6, one can repeat steps similar to the above, and construct an entire hierarchy to accommodate all the LLIDs. Note that the transmission thresholds of LLIDs within a given priority level is based on the bandwidth and maximum allowable delay negotiated in the corresponding SLA.

Fault Tolerance

Figure 7:
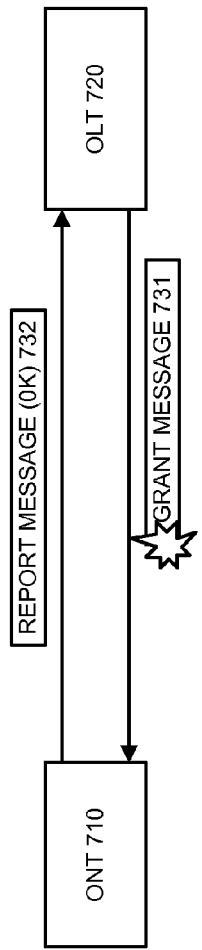
FIG. 7 illustrates a time-out mechanism for outstanding data that provides fault tolerance in accordance with an embodiment of the present invention.

FIG. 7 illustrates a time-out mechanism for outstanding data that provides fault tolerance in accordance with an embodiment of the present invention. During operation, it is possible that a grant message 731 is lost on its way from OLT 720 to ONU 610, for example due to a bit error. As a result, the subsequent grant messages received by ONU 710 for the same LLID will grant transmission sizes that are inconsistent with the amount of data available for upstream transmission. This may manifest itself by the ONU receiving a grant that is not a frame boundary. Once ONU 710 detects this inconsistency, it will start sending special report messages to OLT 720, requesting a transmission size of 0 Kb. Meanwhile, OLT 720 keeps track of when a piece of upstream data associated with a grant is due to arrive. Whether or not this piece of data physically arrives for the grant, the OLT removes the information corresponding to the outstanding data for the grant.

After sending the special report messages (with request of 0 K) for a period of time, ONU 710 resumes sending normal request messages. By this time the lost grant message, and its residual effects, would have timed out in OLT 720 and normal operation resumes.

It is possible for an ONU to track the amount of time between grants. If the amount of time between grants exceeds a certain interval, ONU 710 sets an alarm and sends a message to OLT 720 via an OAM frame. This can be done via an LLID on the ONU that is reserved for processor traffic. This message will instruct OLT 720 that an LLID is not being granted. One way for OLT 720 to deal with this situation is to reset the LLID entry in the DBA and bandwidth shaper tables.

In another scenario, OLT 720 periodically sends out polls to ONUs to see if an LLID has any data to send. Polls are grants for 64 bytes of data that have a forced-report flag asserted. The only upstream data transmitted as a response to a poll is a single report frame. The polling frequency reflects the SLA of an LLID. For example, the polls for priority 0 LLIDs are sent every 1 ms. If a grant previously occurred, the subsequent poll will be sent at 1 ms after that grant being sent.

Correspondingly, a non-poll grant is a grant that allows transmission of more than just a single report frame. An ONU tracks the amount of time elapsed between non-poll grants for each LLID. If this time exceeds a certain interval, the ONU sets an alarm. If the alarm is set, and the ONU has data to send, the ONU will send a message to the OLT, via an OAM frame, denoting the error condition. This will instruct the OLT that an LLID is in an error state. One way for the OLT to deal with this situation is to reset or modify the LLID entry in the DBA and bandwidth scheduler tables.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically allocating upstream bandwidth in a passive optical network, the method comprising:
   determining at an Optical Line Terminal (OLT) an upstream transmission threshold dynamically for a logical entity associated with an Optical Network Unit (ONU) based on one or more of the following:
      the maximum allowable delay associated with a priority level assigned to the logical entity;
      data speed of a shared out-going uplink at the OLT;
      the logical entity's service level agreement; and
      the total number of logical entities within that priority level;
   receiving a request from the ONU to transmit upstream data from the logical entity, wherein the logical entity may not request to transmit more data than what is allowed by the transmission threshold;
   issuing a grant to the ONU for transmitting upstream data;
   in response to the grant, receiving upstream data from the ONU;
   storing the received upstream data in a receiver buffer within the OLT;
   keeping a record of outstanding upstream data which is granted for transmission from the ONU but not yet received by the OLT for each logical entity;
   subtracting the size of outstanding upstream data from the unfilled space of the receiver buffer to calculate available space in the receiver buffer; and
   transmitting the received upstream data on the shared out-going uplink.

2. The method of claim 1,
   wherein the receiver buffer includes a number of FIFO queues, each of which buffers upstream data received from an associated logical entity; and
   wherein transmitting the received upstream data involves retrieving and transmitting the upstream data stored in the receiver buffer to the out-going uplink according to a set of service level agreements.

3. The method of claim 2, further comprising:
   determining whether the receiver buffer has sufficient space to accommodate the upstream data to be transmitted as requested; and
   determining whether the logical entity from which upstream data transmission is requested is scheduled to transmit data next.

4. The method of claim 1, further comprising scheduling a number of logical entities within the passive optical network to transmit upstream data using a hierarchical round-robin scheme.

5. The method of claim 4, wherein scheduling the logical entities to transmit upstream data comprises:
   (1) grouping logical entities with the highest priority to form a top-priority level;

(2) allowing each logical entity in the top-priority level to transmit upstream data in a round-robin fashion by assigning a slot to each logical entity in the top-priority level;

(3) within the top-priority level, reserving at least one slot for lower-priority traffic;

(4) grouping logical entities with the next-highest priority to form a next-highest-priority level;

(5) allowing each logical entity in the next-highest-priority level to transmit data by assigning the reserved slot within the immediately higher-priority level to each logical entity in the next-highest-priority level in a round-robin fashion;

(6) within the next-highest-priority level, reserving at least one slot for lower-priority traffic; and (7) repeating operations similar to operations (4)-(6) for logical entities with lower priorities until every logical entity is assigned a slot for transmitting upstream data according to its priority.

6. The method of claim 1, wherein all the logical entities within the passive optical network are scheduled to transmit upstream data using a strict priority scheduling scheme.

7. The method of claim 1, further comprising:
timing out the outstanding upstream data after a predetermined period.

8. The method of claim 2, wherein retrieving and transmitting data stored in the receiver buffer to the out-going uplink according to a set of service level agreements involves retrieving and transmitting data stored in each FIFO queue using a hierarchical round-robin scheme in accordance with each logical entity's service level agreement.

9. The method of claim 1, wherein a respective ONU includes a number of queues, each of which is associated with a logical entity and stores upstream data from that logical entity.

10. The method of claim 9,
wherein the request from an ONU reports the state of a queue within that remote node associated with a logical entity; and
wherein the request piggybacks on an upstream data transmission.

11. The method of claim 9, wherein if a FIFO queue within the receiver buffer in the OLT is full, the method further comprises pausing the issuance of grants to the corresponding logical entity, thereby causing the queue associated with that logical entity within the corresponding ONU to become full, upon which the ONU generates a flow-control message to the corresponding logical entity to slow down the upstream data transmission from that device or user.

12. The method of claim 1, further comprising:
periodically sending polls to the ONU for upstream data;
wherein the polling frequency for a corresponding logical entity reflects the service level agreement of that logical entity.

13. A system for dynamically allocating upstream bandwidth in a passive optical network, the system comprising:
a bandwidth allocation mechanism configured to determine at an Optical Line Terminal (OLT) an upstream transmission threshold dynamically for a logical entity associated with an Optical Network Unit (ONU) based on one or more of the following:
the maximum allowable delay associated with a priority level assigned to the logical entity;
data speed of a shared out-going uplink at the OLT;
the logical entity's service level agreement; and
the total number of logical entities within that priority level;

a request receiving mechanism configured to receive a request from the ONU to transmit upstream data from the logical entity, wherein the logical entity may not request to transmit more data than what is allowed by the transmission threshold;

a grant issuance mechanism configured to issue a grant to the ONU for transmitting upstream data;

a data receiving mechanism configured to receive upstream data from the ONU;

a storage mechanism configured to store the received upstream data in a receiver buffer within the OLT;

a record-keeping mechanism configured to keep a record of outstanding upstream data which is granted for transmission from the ONU but not yet received by the OLT for each logical entity;

a subtraction mechanism configured to subtract the size of outstanding upstream data from the unfilled space of the receiver buffer to calculate available space in the receiver buffer; and a transmission mechanism configured to transmit the received upstream data on the shared out-going uplink.

14. The system of claim 13,
wherein the receiver buffer includes a number of FIFO queues, each of which buffers upstream data received from an associated logical entity; and
wherein while transmitting the received upstream data, the transmission mechanism is configured to retrieve and transmit the upstream data stored in the receiver buffer to the out-going uplink according to a set of service level agreements.

15. The system of claim 14, wherein the storage mechanism is further configured to:
determine whether the receiver buffer has sufficient space to accommodate the upstream data to be transmitted as requested; and
determine whether the logical entity from which upstream data transmission is requested is scheduled to transmit data next.

16. The system of claim 13, further comprising a scheduling mechanism configured to schedule a number of logical entities within the passive optical network to transmit upstream data using a hierarchical round-robin scheme.

17. The system of claim 16, wherein while scheduling the logical entities to transmit upstream data, the scheduling mechanism is configured to:

(1) group logical entities with the highest priority to form a top-priority level;

(2) allow each logical entity in the top-priority level to transmit upstream data in a round-robin fashion by assigning a slot to each logical entity in the top-priority level;

(3) within the top-priority level, reserve at least one slot for lower-priority traffic;

(4) group logical entities with the next-highest priority to form a next-highest-priority level;

(5) allow each logical entity in the next-highest-priority level to transmit data by assigning the reserved slot within the immediately higher-priority level to each logical entity in the next-highest-priority level in a round-robin fashion;

(6) within the next-highest-priority level, reserve at least one slot for lower-priority traffic; and (7) repeat operations similar to operations (4)-(6) for logical entities with lower priorities until every logical entity is assigned a slot for transmitting upstream data according to its priority.

18. The system of claim 13, wherein all the logical entities within the passive optical network are scheduled to transmit upstream data using a strict priority scheduling scheme.

19. The system of claim 14, further comprising:
a time-out mechanism configured to time out the outstanding upstream data after a predetermined period.

20. The system of claim 14, wherein while retrieving and transmitting data stored in the receiver buffer to the out-going uplink according to a set of service level agreements, the transmission mechanism is configured to retrieve and transmit data stored in each FIFO queue using a hierarchical round-robin scheme in accordance with each logical entity's service level agreement.

21. The system of claim 13, wherein a respective ONU includes a number of queues, each of which is associated with a logical entity and stores upstream data from that logical entity.

22. The system of claim 21,
wherein the request from an ONU reports the state of a queue within that ONU associated with a logical entity; and
wherein the request piggybacks on an upstream data transmission.

23. The system of claim 21, wherein if a FIFO queue within the receiver buffer in the OLT is full, the grant issuance mechanism is further configured to pause the issuance of grants to the corresponding logical entity, thereby causing the queue associated with that logical entity within the corresponding ONU to become full, upon which the ONU generates a flow-control message to the corresponding logical entity to slow down the upstream data transmission from that device or user.

24. The system of claim 13, further comprising:
a polling mechanism configured to periodically send polls to the ONU for upstream data;
wherein the polling frequency for a corresponding logical entity reflects the service level agreement of that logical entity.

25. An Optical Line Terminal (OLT) for dynamically allocating upstream bandwidth in a passive optical network, the OLT comprising:
a bandwidth allocator configured to determine dynamically an upstream transmission threshold for a logical entity associated with an Optical Network Unit (ONU) based on one or more of the following:
the maximum allowable delay associated with a priority level assigned to the logical entity;
data speed of a shared out-going uplink at the OLT;
the logical entity's service level agreement; and
the total number of logical entities within that priority level;
a request receiving mechanism configured to receive a request from the ONU to transmit upstream data from the logical entity, wherein the logical entity may not request to transmit more data than what is allowed by the transmission threshold;
a grant issuing mechanism configured to issue a grant to the ONU for transmitting upstream data;
a data receiving mechanism configured to receive upstream data from the ONU;
a storage mechanism configured to store the received upstream data in a receiver buffer within the OLT;
a record-keeping mechanism configured to keep a record of outstanding upstream data which is granted for transmission from the ONU but not yet received by the OLT for each logical entity;
a subtraction mechanism configured to subtract the size of outstanding upstream data from the unfilled space of the receiver buffer to calculate available space in the receiver buffer; and
a transmission mechanism configured to transmit the received upstream data on the shared out-going uplink.

\* \* \* \* \*